May 29, 1962 C. L. RUTHROFF 3,037,173
HYBRID NETWORK
Filed Jan. 23, 1959

($R_2=R_3=2R_4=\frac{1}{2}R_1$)

($R_2=R_3=2R_4=2R_1$)

INVENTOR
C. L. RUTHROFF
BY Roy M. Porter Jr.
ATTORNEY

United States Patent Office 3,037,173

Patented May 29, 1962

3,037,173

HYBRID NETWORK

Clyde L. Ruthroff, Fair Haven, N.J., assignor to Bell Telephone Laboratories, Incorporated, New York, N.Y., a corporation of New York Filed Jan. 23, 1959, Ser. No. 788,648

5 Claims. (Cl. 333—11)

This invention relates to wave transmission systems, and, in particular, to broad-band coupling arrangements commonly known as hybrid networks for use in such systems.

One of the more useful circuit arrangements employed in communications networks is the so-called hybrid network. This type of network is of particular importance in that it makes possible the two-way operation of a telephone line. However, because of its nature, the ordinary hybrid coil is not adaptable to the higher frequencies. Thus, as the range of operating frequencies is extended, as is the current trend, the problems of distortion and unbalance in hybrid networks have become more acute. For example, in order to supply gain and to transmit pulses of millimicrosecond duration, amplifiers and coupling networks with bandwidths of hundreds of megacycles are needed. While the problem of extending the frequency range of hybrid networks has received the attention of many investigators, current circuit arrangements still fall far short of fulfilling the bandwidth requirements presently encountered in the communications art.

In my copending application Serial No. 734,751, filed May 12, 1958, broad-band bifilar wound transformers are described which have bandwidth ratios as high as 20,000 to 1 in the frequency range of a few tens of kilocycles to over a thousand megacycles. It is therein indicated that the frequency limitations in a conventional transformer of a type which might be used in a hybrid network are in great part due to the series self-inductance and parasitic interwinding capacitance of the transformer windings themselves. For example, in a conventionally wound transformer, the upper end of the pass-band is generally determined by the large interwinding capacity which resonates at some relatively low frequency, while the low frequency end of the pass-band is limited by a relatively small coil inductance which appears as a low impedance in parallel with the signal source. While these limitations have been somewhat overcome by the use of miniature construction and new and improved magnetic core materials, this type of approach to the problem has enjoyed only limited success.

It is, therefore, an object of this invention to produce broad-band hybrid network arrangements using a single bifilar wound coil.

By applying transmission line theory to the transformer art, broad-band transformers of the type described in my copending application are now available. It has been recognized in accordance with the present invention that bifilar transformers of this type may be adapted and utilized to produce broad-band hybrid networks by the appropriate interconnection of the bifilar transformers and the external utilization networks. As will be shown hereinafter, transformers utilized in this manner preserve their broad-band characteristics and produce hybrid coupling properties.

A broad-band hybrid network constructed in accordance with the invention comprises a pair of insulated conductive wires, uniformly spaced from each other and wound together in a substantially helical form. A coil so wound has the distributed properties of a uniform transmission line and the corresponding broad-band capabilities when used as a transformer. The two coils thus formed are serially connected by joining one end of one of them to the other end of the second coil, that is, by joining non-adjacent ends of the two coils. Utilizing means are connected from each of the remaining free ends and from the interconnection to a common terminal. Additional utilizing means are connected either between the free ends or between the interconnection and one of the free ends, depending upon the impedance match desired.

These and other objects and advantages, the nature of the present invention, and its various features, will appear more fully upon consideration of the various illustrative embodiments now to be described in detail in connection with the accompanying drawings, in which.

Figure 1:
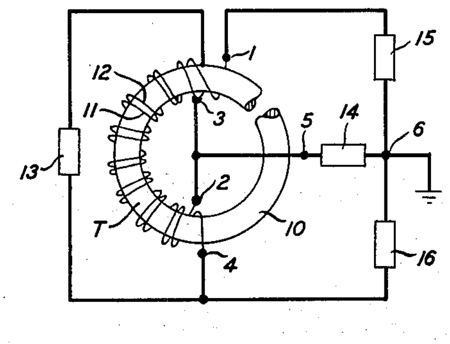
FIG. 1 shows diagrammatically a hybrid network connected in accordance with the principles of the invention.

Referring to the accompanying drawings, and more specifically to FIG. 1, there is diagrammatically shown a first embodiment of a broad-band hybrid network connected in accordance with the present invention. The transformer T comprises a pair of insulated conductive filaments 11 and 12, wound together in a substantially helical form over coil form 10. Insulated filaments 11 and 12 are arranged so that their insulated coverings are in close juxtaposition substantially throughout their entire lengths. The juxtaposition or contiguous arrangement of these two wires is such as to produce substantially unity coupling between the two windings and, in addition, to produce the equivalent of a uniform parallel wire transmission line from one end of the coil to the other end thereof. The double threaded spiral or helical coils described above are known in the art as bifilar coils and will be referred to as such hereinafter. The actual spacing of the conductive portions of members 11 and 12, and the diameter of said conductors, will be considered in greater detail below.

The bifilar coil is mounted upon a coil form 10 which may be composed of any suitable high permeability, low-loss core material. For example, a number of transformers using nickel-zinc ferrite cores have been constructed and have given very satisfactory results. While coil form 10 has been shown as a toroidal member, it may assume any convenient shape consistent with the electrical requirements of the transformer windings.

Coils 11 and 12 are serially connected by joining non-adjacent ends 2 and 3 to form an internal interconnection. The latter is brought out as terminal 5.

Connected to coils 11 and 12 are the two pairs of conjugate impedances 13 and 14 and 15 and 16. One pair of conjugate impedances 15 and 16 connects between terminals 1 and 4, respectively, and the common terminal 6. Impedance 14, of the second pair of conjugate impedances 13 and 14, connects between the common junction 6 and the interconnection 5. The other impedance, 13, is connected across terminals 3 and 4.

Figure 2:
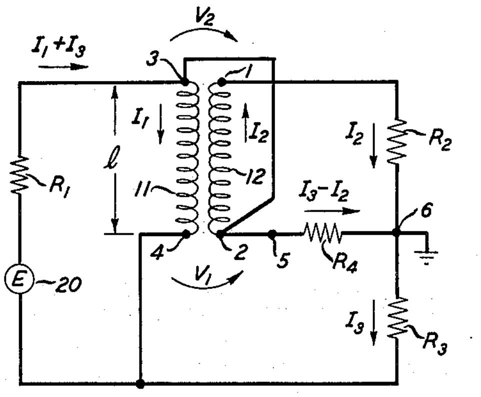
FIG. 2 is a schematic illustration of the network of FIG. 1.

In FIG. 2 there is shown a schematic diagram of the network of FIG. 1 in which impedance 13 of FIG. 1 more specifically comprises a signal generator 20 and its equivalent internal impedance $R_1$, and impedance 14 comprises a resistor $R_4$. The conjugate impedances 15 and 16 are represented by the two equal resistors $R_2$ and $R_3$.

The hybrid operation of the network and its frequency response, may be demonstrated by considering the currents produced as a result of a signal E impressed upon the circuit by signal generator 20. Assuming that the reactance of each winding is much larger than the terminating resistances and that the coupling coefficient $k$ is equal to unity, the network equations may be written as:

$$E=R_1(I_1+I_3)-V_2+I_2R_2+R_3I_3$$

$$E=R_1(I_1+I_3)-V_2+I_2R_2-(I_3-I_2)R_4+V_1$$

$$E=R_1(I_1+I_3)+R_4(I_3-I_2)+R_3I_3$$

$$V_1=V_2 \cos \beta l+jI_2Z_0 \sin \beta l$$

$$I_1=I_2 \cos \beta l+j\frac{V_2}{Z_0} \sin \beta l$$

where $l$ is the equivalent length of transmission line formed by the bifilar windings 11 and 12, $\beta$ is the phase constant of this line, and $Z_0$ is the characteristic impedance of the line. Solving for the currents gives $$I_1=\frac{E}{\Delta}\left\{R_4+(R_3+R_4) \cos \beta l +j \frac{\sin \beta l}{Z_0}(R_2R_3+R_2R_4+R_3R_4)\right\}$$

$$I_2=\frac{E}{\Delta}\{R_3+R_4(1+ \cos \beta l)\}$$

$$I_3=\frac{E}{\Delta}\{R_4(1+ \cos \beta l)+R_2 \cos \beta l+jZ_0 \sin \beta l\}$$

where $$\Delta=2R_1R_4+[R_3R_4+R_1R_2+R_2R_3+R_2R_4+2R_1R_4+R_1R_3] \cos \beta l+jZ_0 \sin \beta l[R_1+R_3+R_4]+j \frac{\sin \beta l}{Z_0}[R_1R_2R_4+R_1R_2R_3+R_1R_3R_4]$$

For balanced loads and matched conditions, $$R_1=R_4=R \text{ and } R_2=R_3=2R$$

Under these conditions, the currents can be written as $$I_1=\frac{ER}{\Delta}\left[1+3 \cos \beta l+j\frac{8R}{Z_0} \sin \beta l\right]$$

$$I_2=\frac{ER}{\Delta}[3+\cos \beta l]$$

$$I_3=\frac{E}{\Delta}[R(1+3 \cos \beta l)+jZ_0 \sin \beta l]$$

where $$\Delta=2R^2\left[1+7 \cos \beta l+j2 \sin \beta l\left(\frac{Z_0}{R}+\frac{2R}{Z_0}\right)\right]$$

Ideally, the current in $R_4$ should be zero. Actually, this current is $$(I_3-I_2)=\frac{E}{\Delta}\{2R[\cos \beta l-1]+jZ_0 \sin \beta l\}$$

However, at low frequencies, when the wavelength is large compared to the winding length, $\beta l$ is small and the current $(I_3-I_2)$ approaches zero in amplitude.

The transmission T is given as the power delivered to the load resistors $R_2$ and $R_3$, divided by the available power, $$\frac{E^2}{4R}$$

For load resistor $R_2$, $$T_2=\frac{|I_2|^2\times 2R}{\frac{E^2}{4R}}$$

or $$T_2=\frac{2(3+\cos \beta l)^2}{(1+7 \cos \beta l)^2+4 \sin^2 \beta l\left(\frac{Z_0}{R}+\frac{2R}{Z_0}\right)^2}$$

The transmission is a maximum when the coefficient of $\sin^2 \beta l$ is a minimum or where $$\frac{d}{dZ_0}\left(\frac{Z_0}{R}+\frac{2R}{Z_0}\right)^2=0$$

Solving for $Z_0$, the characteristic impedance of the transformer, gives $$Z_0=\sqrt{2R}$$

The transmission $T_3$ to load $R_3$ may also be calculated and is found to be $$T_3=\frac{|I_3|^2\times 2R}{\frac{E^2}{4R}}=\frac{2\{(1+3 \cos \beta l)\}^2+\left(\frac{Z_0}{R}\right)^2 \sin^2 \beta l}{(1+7 \cos \beta l)^2+4 \sin^2 \beta l\left[\frac{Z_0}{R}+\frac{2R}{Z_0}\right]^2}$$

It will be noted that both $T_2$ and $T_3$ at low frequencies ($\beta l\approx 0$) are equal to ½, as expected.

Letting $Z_0=\sqrt{2R}$ and solving for the ratio of the transmission to loads $R_2$ and $R_3$, gives $$\frac{T_2}{T_3}=\frac{(3+\cos \beta l)^2}{(1+3 \cos \beta l)^2+2 \sin^2 \beta l}$$

At low frequencies $\beta l=0$ and $T_2/T_3=1$, or, equal power is delivered to each of the load resistors $R_2$ and $R_3$. At $\beta l=\pi/4$, or at a frequency for which the transformer has an equivalent length equal to one-quarter wavelength, the ratio of the power delivered to the two load resistors $R_2$ and $R_3$ is 1.28, or the power split is unequal by about 1 decibel. At half a wavelength, the ratio of power delivered to the two resistors is 3:1.

The ratio of power delivered to the conjugate resistor $R_4$ to the available power is given as $$T_4=\frac{4(\cos \beta l-1)^2+2 \sin^2 \beta l}{(1+7 \cos \beta l)^2+32 \sin^2 \beta l}$$

At $\beta l=0$, $T_4$ is equal to zero. At $\beta l=\pi/4$, $T_4=.0332$ or or the insertion loss from $R_1$ to $R_4$ is about 30 decibels. Ideally, of course, the insertion loss should be infinite at all frequencies or $T_4$ should equal zero.

Figure 3:
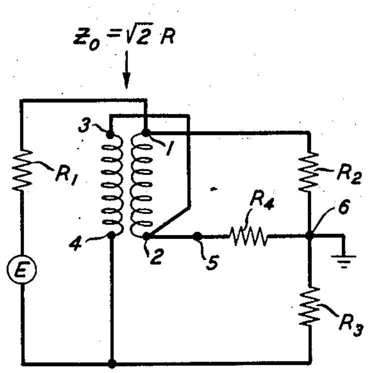
FIG. 3 is a schematic illustration of a hybrid network modified for impedance matching purposes.

In the embodiment of FIG. 1 and FIG. 2, the conjugate resistors $R_1$ and $R_4$ are equal. In some applications, however, these resistors are more conveniently made unequal. In particular, for those applications in which $R_1=4R_4$, the circuit is modified as shown in FIG. 3, wherein resistor $R_1$ is connected across both of the serially connected coils 11 and 12. As shown, resistor $R_1$ connects from the terminal 1 to terminal 4, all other connections being the same as in FIG. 1.

In either arrangement, however, the characteristic impedance of the transmission line formed by the bifilar wound coils 11 and 12 is given as $Z_0=\sqrt{2R}$. In terms of the wire size and spacing, $$Z_0=\sqrt{2R}=\frac{\sqrt{\frac{\mu}{\epsilon}}}{\pi} \cos h^{-1}\left(\frac{b}{a}\right)$$

where $\mu$ is the effective permeability;
$\epsilon$ is the effective dielectric constant;
$b$ is the distance between wire centers, and
$a$ is the wire diameter.

Figure 4:
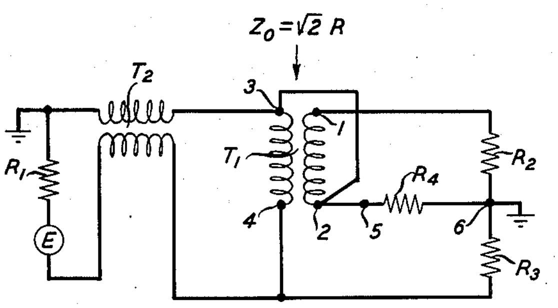
FIG. 4 is a schematic illustration of a hybrid network modified to accommodate single ended utilization means.

An examination of the hybrid networks shown in FIGS. 1 and 3, discloses that at best only three of the four loads can be grounded simultaneously. In FIG. 2, the common terminal 6 for resistors $R_2$, $R_3$ and $R_4$ is grounded, whereas the generator, 20, is double-ended, or balanced with respect to ground. This arrangement may be modified, and all four load resistors operated single-ended, by using an additional bifilar transformer as shown in FIG. 4. In FIG. 4, generator 20 and resistor $R_1$ are connected to transformer $T_1$ through the second transformer $T_2$ which acts as a simple balanced-to-unbalanced transformer. Because of the broad-band properties of this type of transformer there is no appreciable degradation in frequency response. The characteristic impedance of transformer $T_2$ is either R or 4R depending upon whether the arrangement of FIG. 1 or FIG. 3 is used. In either arrangement, however, all four loads may be operated single-ended, with the grounds as shown in FIG. 4 as a typical arrangement.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a two-element transmission line having a characteristic impedance $Z_0$ comprising two insulated conductive wires wound together in a substantially helical form to form a pair of coils, said wires being contiguous and parallel from the first end of each to the second end of each, said coils being serially interconnected with said first end of one being connected directly to the second end of the other, first and second external circuits each having an impedance 2R connected from each of the remaining free ends of said coils to a common terminal, a third external circuit having an impedance R connected from said interconnection to said common terminal, and a fourth external circuit connected between a pair of ends of said coils wherein said characteristic impedance and said external circuit impedances are related by $Z_0=\sqrt{2}R$.

2. The combination according to claim 1 wherein said fourth circuit is connected between said free ends and has an impedance 4R.

3. The combination according to claim 1 wherein said fourth circuit is connected between one of said free ends and said interconnection and has an impedance R.

4. The combination according to claim 1 wherein said common terminal is grounded and said fourth circuit is balanced with respect to ground.

5. The combination according to claim 1 wherein said common terminal is grounded and said fourth circuit comprises an unbalanced-to-balanced transformer and a load which is unbalanced with respect to ground.

References Cited in the file of this patent

UNITED STATES PATENTS

| | | |
|---|---|---|
| 1,755,243 | Crisson | Apr. 22, 1930 |
| 2,229,078 | Hansell | Jan. 21, 1941 |
| 2,654,836 | Beck | Oct. 6, 1953 |
| 2,735,988 | Fyler | Feb. 21, 1956 |
| 2,736,864 | Sinclair | Feb. 28, 1956 |
| 2,875,283 | Maione | Feb. 24, 1959 |

OTHER REFERENCES

Article, "The Hybrid Coil," from Electrical Communication by Arthur L. Albert, 2nd ed., John Wiley & Sons, Inc. (1940), page 434 relied upon.